United States Patent [19]
Fletcher et al.

[11] 3,777,942
[45] Dec. 11, 1973

[54] POTABLE WATER DISPENSER

[76] Inventors: James C. Fletcher, Administrator of the National Aeronautics and Space Administration with respect to an invention of; Herbert R. Cunningham, 13442 Epping Way Tustin, Calif. 92680

[22] Filed: June 28, 1972

[21] Appl. No.: 266,930

[52] U.S. Cl. ............... 222/309, 222/340, 222/387, 222/514

[51] Int. Cl. ............................................. G01f 11/06

[58] Field of Search ............... 222/305, 307, 309, 222/340, 387, 514, 442

[56] References Cited
UNITED STATES PATENTS

| | | | |
|---|---|---|---|
| 1,979,428 | 11/1934 | Wheeler | 222/309 |
| 3,601,845 | 8/1971 | Mavrich | 222/309 X |
| 1,512,060 | 10/1924 | Schmucker | 222/309 |
| 3,231,149 | 1/1966 | Yuza | 222/309 X |
| 3,278,094 | 10/1966 | Perry | 222/514 X |

*Primary Examiner*—Samuel F. Coleman
*Assistant Examiner*—Joseph J. Rolla
*Attorney*—L. D. Wofford, Jr. et al.

[57] ABSTRACT

A potable water dispenser particularly suited for use in dispensing potable water into food and beverage reconstitution bags. The dispenser is characterized by an expansible chamber, selectively adjustable stop means for varying the maximum dimensions achievable by the chamber, a rotary valve and a linear valve coupled in a cooperating relation for delivering potable water to and from the chamber.

5 Claims, 7 Drawing Figures

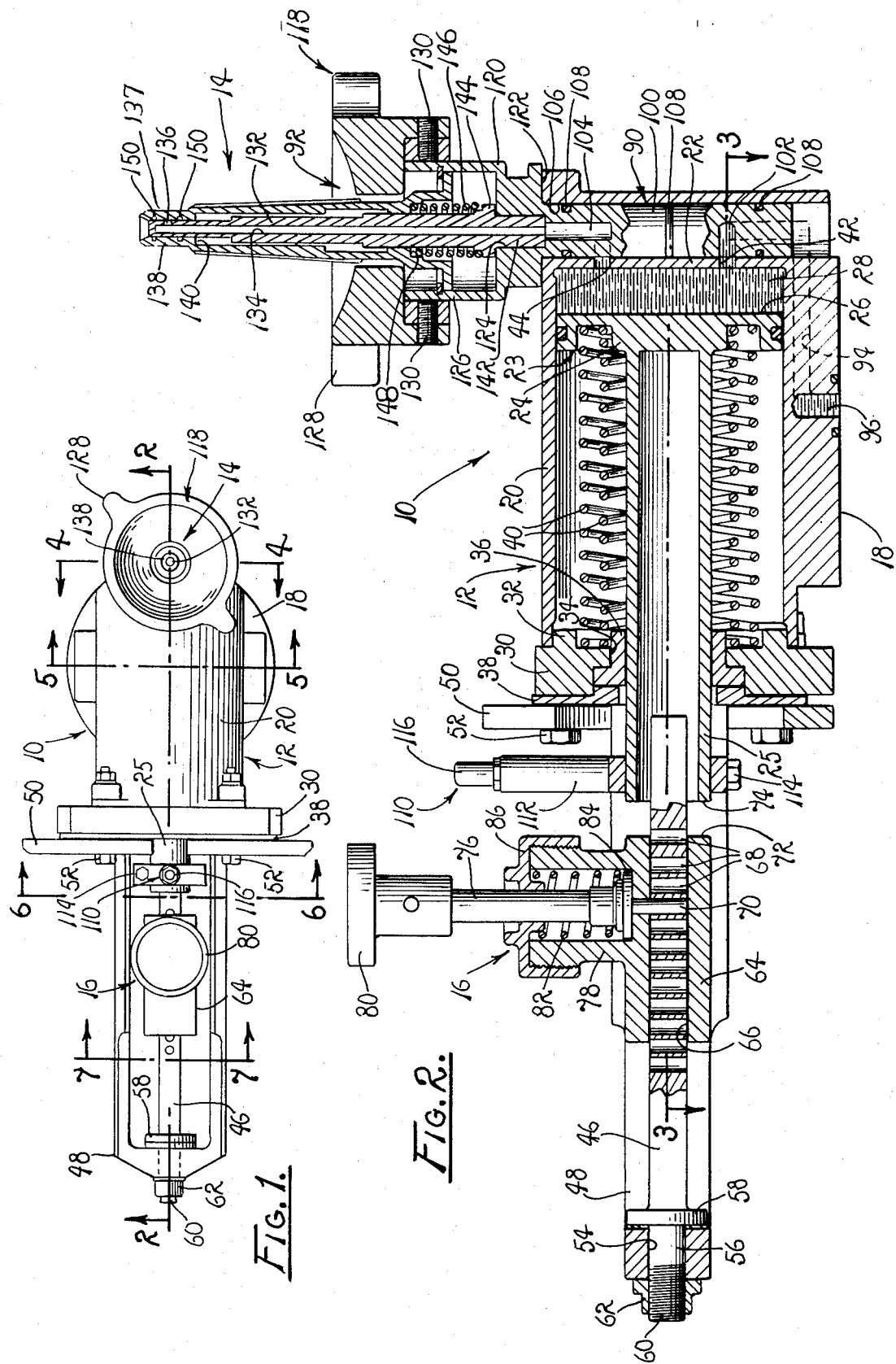

POTABLE WATER DISPENSER

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The invention relates to water dispensers and more particularly to a potable water dispenser for use in measuring and dispensing potable water utilized in reconstituting food and beverages aboard operative spacecraft.

The prior art, of course, is replete with dispensers equipped with valves and the like for dispensing fluids of various types including potable water. However, currently available dispensers do not meet the stringent requirements imposed on such devices during missions of extended duration, aboard spacecraft.

For reasons well known to those engaged in manned space flight operations, it is highly desirable that there be kept an accurate record of the fluid taken by crewmen aboard operative spacecraft. This record, of course, includes the fluid found in food and beverages. During missions of extended duration, food often is provided in dehydrated condition and thereafter is reconstituted, i.e., returned to a hydrated condition. This necessarily requires an addition of preselected quantities of potable water. Such reconstitution requires that the water utilized be accurately measured and efficiently dispensed. In order to assure that an accurate record be maintained for the water consumed by crewmen throughout a mission, such measuring and dispensing of the water employed in reconstituting food and beverages also must be easily and readily accomplished, particularly where crewmen are functioning under adverse conditions of the type encountered on such missions. Hence, the dispenser employed must be highly reliable, simple to operate, and of a simple, lightweight and rugged construction.

The prior art also includes dispensing devices having spring-loaded mechanisms for dispensing selected quantities of fluid maintained under pressure. Representative of such prior art devices is the device disclosed in the U.S. Pat. to No. 1,979,428 to Wheeler. This patent discloses a spring-biased piston seated within a cylinder and displaceable for delivering quantities of fluid. However, available devices simply do not fulfill existing needs, where such a device must be of a simple, economic construction, readily operable in a weightless environment for accurately dispensing variable quantities of water into reconstitution bags.

It is therefore the purpose of the instant invention to provide a rugged, simple to operate, economic, and highly reliable dispenser for use in accurately dispensing predetermined quantities of potable water to reconstitution bags aboard an operative spacecraft during missions of extended duration.

OBJECTS AND SUMMARY OF THE INVENTION

It is therefore an object of the instant invention to provide an improved dispenser for dispensing potable water.

It is another object to provide a simplified, readily operable dispenser for use in precisely measuring and dispensing potable water to bags utilized in reconstituting food and beverages aboard operative spacecraft.

It is another object to provide a practical dispenser for use in accurately measuring and efficiently dispensing predetermined quantities of potable water in a weightless environment.

It is another object to provide an economic and practical dispenser for use in delivering variable, accurately measured quantities of water in a weightless environment.

It is another object to provide an improved, economic, highly reliable and efficient dispenser for use in dispensing variable, accurately measured successive charges of water to bags utilized in reconstituting food and beverages in a weightless environment.

These and other objects and advantages are achieved through the use of a variably dimensioned measuring chamber coupled to a pressurized source of potable water through a manually operable rotary valve employed in controlling the charging of the chamber and a manually operable linear valve coupled with the chamber through the rotary valve for dispensing measured quantities of water from the chamber in measuring and delivering potable water to reconstitution bags, as will become more readily apparent by reference to the following description and claims in light of the accompanying drawings. BRIEF DESCRIPTION OF THE DRAWINGS FIG. 1 is a top plan view of a dispenser embodying the principles of the instant invention.

FIG. 2 is a cross-sectional view, taken generally along line 2—2 of FIG. 1, but on somewhat of an enlarged scale.

DESCRIPTION OF THE PREFERRED EMBODIMENT

Figure 3:
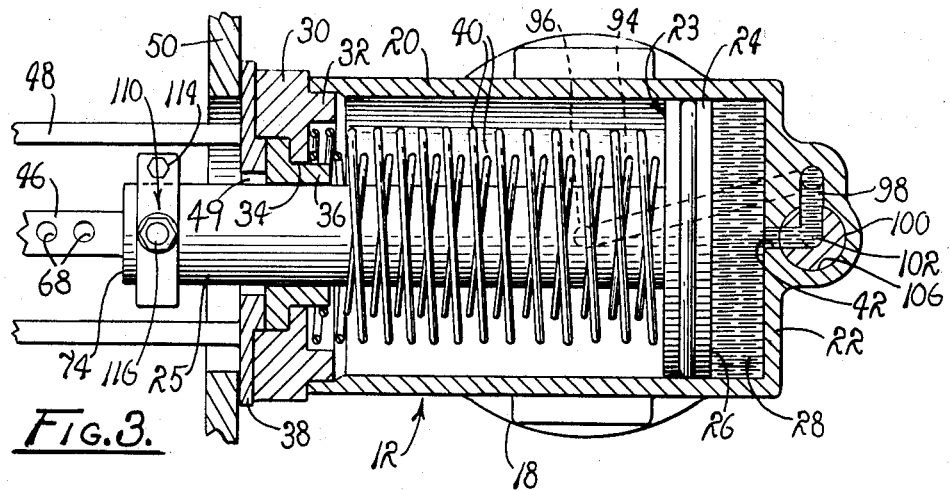
FIG. 3 is a cross-section plan view, taken in a plane extending generally along line 3—3 of FIG. 2.

Referring now to the drawings wherein like reference characters designate like or corresponding parts throughout the several views, there is shown in FIG. 1 a potable water dispenser 10 which embodies the principles of the instant invention.

While not shown, it is to be understood that the dispenser 10 is particularly suited for mounting in a work table of the type found within wardrooms of an operative spacecraft and the like. The particular manner in which the dispenser 10 is supported in the table, or the arrangement thereof relative to the table, is a matter of convenience. However, it is to be understood that the dispenser 10 preferably is so arranged as to afford ready access thereto in order to accommodate dispensing of potable water for use in reconstituting dehydrated food and beverages.

It also is to be understood that the dispenser 10 is employed in dispensing either hot or cold water, preferably in increments of a one-half ounce, within a range of 1 ounce to 6 ounces with an accuracy of plus or minus 1 percent. Furthermore, and as a practical matter, the dispenser 10 is fabricated from materials compatible with water having a temperature ranging between approximately 40° to 150° F., depending upon the temperature of the particular source of water to which the dispenser is connected, as well as with biocides of a type normally dissolved or suspended in the source of water. All internal seals, of course, also are of a material compatible with the purposes for which a dispenser is employed.

As shown, FIG. 1, the dispenser 10 includes a body 12, having a water dispensing jet 14 disposed at one end thereof and a measuring stop 16 provided at its opposite end. As a practical matter, the dispenser 10 is supported by a base 18 through which mounting of the dispenser 10 within a table is accommodated.

As best illustrated in FIG. 2, the body 12 includes a substantially cylindrical wall 20 closed at one end by a transverse end plate 22 welded or otherwise suitably affixed to the cylindrical wall 20. Within the cylindrical wall 20 there is seated a piston 23 having a head 24 and a shaft 25 axially extended therefrom. The head 24 includes a planar face 26 disposed in opposition to the end plate 22, in a manner such that the contiguous surfaces of the cylindrical wall 20, the end plate 22, and the face 26 define within the body 12 an expansible chamber 28.

Expansion of the chamber 28 occurs along the longitudinal axis of symmetry of the body 12 as the piston head 24 is displaced axially away from the end plate 22. Consequently, the instantaneous longitudinal dimension of the chamber 28 is determined by the distance through which the piston head 24 has been displaced in a direction extending away from the end plate 22.

For closing the end of the body 12, opposite the end plate 22, there is provided a closure plate 30. The closure plate 30 preferably includes an annular lip 32 which is received internally of the cylindrical wall 20 in frictional engagement with the adjacent surfaces of the wall 20. The closure plate is coupled with wall 20 through suitable screws, welds and the like, not shown.

The closure plate 30 also includes a concentric opening 34 within which there is seated a bushing 36. The bushing 36 includes a concentric opening for receiving therein the piston shaft 25 and is supported in place by a suitable retainer plate 38. As a practical matter, there is provided between the closure plate 30 and the piston head 24 a pair of concentrically related compression springs 40 of a helical configuration circumscribing the shaft 25. These springs act in compression and continuously urge the piston head 24 toward the end plate 22. Thus it can be appreciated that the piston head is supported against misalignment, as reciprocating axial displacement is imparted thereto, by the shaft 25 and that a predetermined orientation for the shaft is maintained by the bushing 36 as the shaft is reciprocated therewithin.

The end plate 22 is provided with a chamber intake port 42 and a chamber ejection port 44 through which water is delivered to and ejected from the chamber 28. The chamber intake port 42, of course, serves to deliver a complete charge of potable water to the chamber 28 while the chamber ejection port 44 serves as a conduit for ejecting the charge, for each cycle of the dispenser's operation.

The quantities of water forming the charges within the chamber 28 are variable and are determined by the magnitude of axial displacement imparted to the piston head 24 as the water is introduced into the chamber through the port 42. Furthermore, axial displacement of the piston head away from the end plate 22 is achieved in response to hydraulic pressures developed within the chamber 28 as a consequence of the applied pressures of the source. Therefore, combined forces, applied by the pair of springs 40, necessarily are less than the forces applied in opposition thereto as the water is introduced from the source through the intake port 42. Consequently, as the water is introduced into the chamber 28, the piston head 24 responsively is displaced as charging of the chamber occurs. Thus, the chamber is expanded, for accommodating its gradual filling, to provide a charge of a precisely measured quantity of water.

Displacement of the piston head 24 is arrested by the measuring stop 16. As best shown in FIG. 2, the piston shaft 25 is of a tubular configuration and telescopically receives the adjacent end of a coaxially aligned stop shaft 46. The stop shaft 46, in turn, is supported by a suitable bracket 48 of a generally U-shaped configuration projected through an opening 49 suitably formed within a base plate 50. Preferably, the bracket 48 is mounted on the retainer plate 38 while the base plate 50 and the retainer plate 38 are provided with a plurality of suitably formed and axially aligned openings through which is extended a plurality of mounting screws 52.

In order to support the stop shaft 46, the bracket 48 also is provided with an opening 54 coaxially aligned with the shaft 25. Into this there is inserted a base portion 56 of the stop shaft 46. The base portion 56 of the stop shaft is provided with a circumscribing collar 58 seated against the surface of the bracket and an externally screw-threaded portion 60 which extends therethrough and receives thereon a nut 62. Thus the stop shaft 46 is supported to be received within the extended end portion of the piston shaft 25 so that as axial displacement is imparted to the piston head 24 mutual telescoping displacement between the shafts 25 and 26 is achieved.

The magnitude of the mutual displacement between the telescoping shafts 25 and 46 is determined through a selective positioning of a block 64. This block is provided with a bore 66 extended therethrough for receiving therein the stop shaft 46. The adjacent surfaces of the stop shaft 46 and the bore 66 serve as mated bearing surfaces for supporting the block 64 as displacement of the block along the shaft 46 occurs in repositioning the block.

In practice, the shaft 46 also includes an aligned multiplicity of pin-receiving openings 68 which serves to receive a locking pin 70 for affixing the block 64 to the stop shaft 46 in order to preclude relative motion therebetween. As a practical matter, the block 64 is provided with an impact face 72 directed toward the body 12, while the distal end of the shaft 25 is provided with an impact face 74, arranged in an opposed relationship to the impact face 72. Accordingly, it can be appreciated that the maximum volume of the chamber 28 is established as the impact face 74 engages the impact face 72 of the block 64 for thus arresting the mutual displacement of the shafts 25 and 46.

As a practical matter, the spacing of pin-receiving openings 68 is such that the longitudinal dimension of the chamber 28 can be varied for selectively altering the axial dimension of the chamber 28 in increments, with an attendant variation in one-half ounce increments for the quantity of water received within the chamber 28. Thus, through a selective positioning of the block 64, a determinable variation in the quantity of water required to fill the chamber 28, for thereby providing a precisely measured charge, is established.

In practice, the pin 70 is projected from a locking shaft 76 seated for axial displacement within a suitable formed housing 78. The shaft also is provided with a manually operable knob 80 affixed to the distal end thereof for accommodating an axial displacement thereof. In practice, a compression spring 82 is seated about the shaft 76 and engages a retention collar 84 fixed to the shaft 76 and a screw-threaded cap 86 employed in closing the housing 78. Thus, the spring 82 is confined and serves to continuously urge the pin 70 toward its locking disposition relative to the pin-receiving opening 68.

Withdrawal of the pin 70 from the opening 68 is achieved simply by manually lifting the knob 80 so that the shaft 76 is axially displaced against the applied force of the compression spring 82. Withdrawal of the pin 70 thus releases the block 64 for repositioning relative to the shaft 46 for thereby altering the volume of the chamber 28.

In order to achieve control in the delivery of water to and from the chamber 28 there is provided a rotary valve, generally designated 90 and a cooperating linear valve, generally designated 92.

Figure 4:
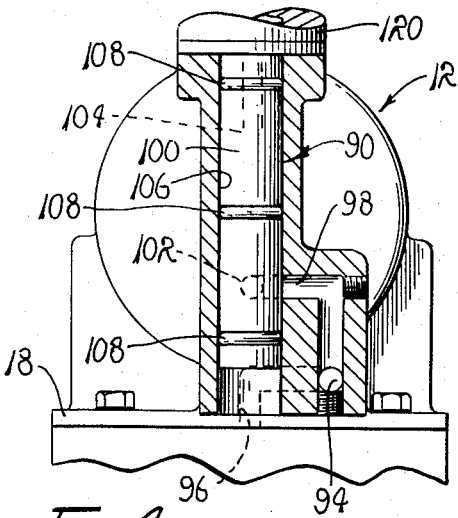
FIG. 4 is a fragmented, sectional view, taken generally along line 4—4 of FIG. 1.
Figure 5:
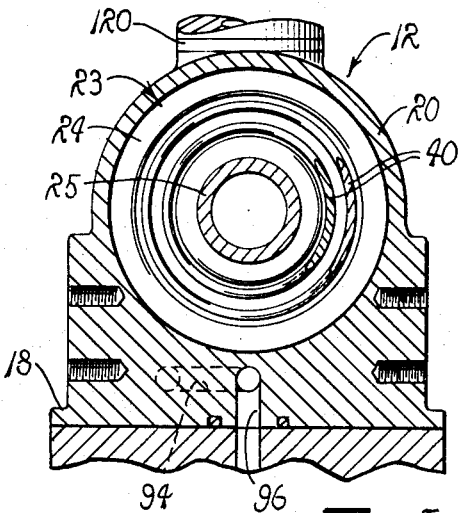
FIG. 5 is a fragmented, sectional view, taken generally along line 5—5 of FIG. 1.
Figure 6:
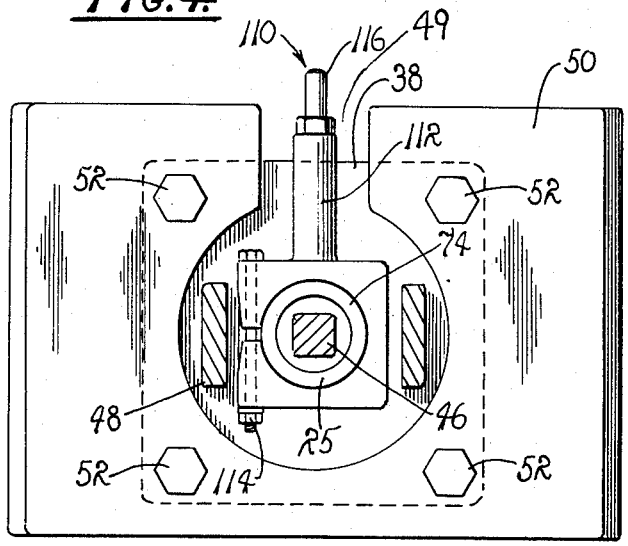
FIG. 6 is a cross-sectional view, taken generally along line 6—6 of FIG. 1, but on somewhat of an enlarged scale.
Figure 7:
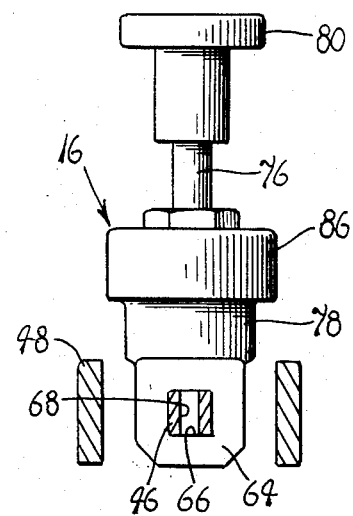
FIG. 7 is a cross-sectional elevational view, taken generally along line 7—7 of FIG. 1, also on a somewhat enlarged scale.

The rotary valve 90 is supported in juxtaposition with the chamber 28 and communicates with the aforementioned source of potable water, not shown, through a delivery conduit 94 formed in any suitable manner. As a practical matter, the conduit 94, FIG. 2, extends from the internally threaded opening 96 to a terminal port 98, FIG. 4, which communicates with a cylindrical shaft 100 of the rotary valve 90.

The port 96 is suitably configured to receive therein a fitting for coupling the dispenser 10 with the source of potable water, while the terminal port 98 is configured to communicate with a segmented, radially extended passageway 102 formed in the shaft 100. As a practical matter, the passageway 102 includes a pair of angularly related segments, not designated, so arranged within the shaft 100 that one end of a passageway 102 communicates with the chamber intake port 42, FIG. 3, while the opposite end of the passageway communicates with the terminal port 98 of the conduit 94. Accordingly, selected rotation of the shaft 100 causes the chamber 28 to communicate with the source of water via the intake port 42, the angularly related segments of the passageway 102, and the conduit 94.

The shaft 100 further is provided with a segmented passageway 103 having a radially extended segment 104 and a base segment 105 axially extended along the longitudinal axis of the shaft 100. The radially extended segment 104 is so oriented as to communicate with the chamber ejection port 44 whereby a path is provided, extending away from the chamber 28 toward the distal end of the shaft 100.

In practice, the radial segments of the passageways 102 and 103 are angularly related, with respect to each other, in a manner such that when a path for the water is established between the terminal port 98 and the chamber intake port 42, the chamber ejection port 44 is closed by the adjacent surface of the shaft 100. Similarly, when a path for the water is established through the passageway 103, from the chamber ejection port 44, the chamber intake port 42 is sealed by the adjacent surface of the shaft 100.

The shaft 100 is received and supported within a bore 106 having an inside diameter substantially equal to the outside diameter of the shaft 100, in order to accommodate a fluid-tight seal therebetween. For reasons which are readily apparent, a fluid-tight seal between the adjacent surfaces of the bore 106 and the shaft 100 is impractical. Therefore, suitable O-ring seals 108 are provided for precluding leakage therebetween. Furthermore, suitable bearing surfaces including lock-rings and the like are employed in supporting the shaft 100 at a desired disposition within the bore 106. Since the particular manner in which the shaft is supported can be varied, a detailed description thereof is omitted in the interest of brevity.

It should be apparent that simply by rotating the shaft 100 to a first appropriate disposition the chamber 28 is permitted to receive a charge while a subsequent rotation to a second position prepares the dispenser to discharge water from the chamber 28.

The instantaneous condition of the chamber 28 readily is indicated through the use of a simple flag, generally designated 110, as the chamber is charged and discharged. The flag 110 includes a shaft 112 fixed to the distal end of the shaft 25 through suitable means including screws 114 and the like. The uppermost or distal end of the shaft 112 is provided with a color indicator 116 for ready recognition. It will therefore be appreciated that whether the chamber 28 is charged, being charged, discharged or being discharged can be readily determined simply by observing the instantaneous position of the indicator 116 relative to the block 64 and the base plate 50.

As best shown in FIG. 2, the shaft 100 also is provided with an actuator segment 118 through which manually imposed, angular displacement is imparted to the shaft. As shown, the segment 118 includes a base portion 120 having a shoulder defined by an annular face 122. This face is mated in a substantially fluid-tight engagement with an adjacent annular face, not designated, circumscribing the bore 106. The base 120 further is provided with a concentric bore 124 coaxially related with the terminal segment of the passageway 104. This bore terminates within a distal portion 126 of the shaft segment 118 to which is affixed a concentrically related hand-actuating knob 128. The knob 128 preferably is affixed to the segment 118 through the use of suitable setscrews 130 and the like. Hence, any rotation imparted to the knob 128, angular displacement about its longitudinal axis of symmetry, is transmitted to the shaft 100 for repositioning the passageways 102 and 103 relative to the chamber intake port 42 and the chamber ejection port 44, respectively.

The linear valve 92 is, in practice, coaxially related to the rotary valve 90, and is concentrically mated with the segment 118 of the shaft 110. These valves are in direct communication so that the linear valve 92, in effect, serves to impose flow control on the water being discharged from the chamber 28, via the passageway 103 of the rotary valve 90.

In order to accomplish this result, the linear valve 92 is provided with an elongated body 132 having a concentric bore 134. At the distal end of the body 132, in direct communication with the bore 134, there is provided a plurality of radially directed ports 136 through which water selectively is ejected from the bore 134. While a single port 136, as shown in FIG. 2, can be employed quite successfully, it is to be understood that as many ports 136 are provided as is desired.

It is important, however, to understand that the bore 134 is blind at its distal end so that the flow of fluid through the bore 134 is accommodated only through the radially extended ports 136, rather than in an axial direction. This arrangement, of course, facilitates a rapid and a practical closing thereof by the distal end portion 137 of a concentrically related closure sleeve 138.

The sleeve 138 is concentrically related to the body 132 and is supported for axial reciprocation between a first and a second position. When in its first position, the distal end portion 137 of the sleeve 138 circumscribes the distal end of the body 132 so that the portion 137 establishes a fluid-tight seal for the ports 136. However, when the sleeve is displaced to its second position the distal end portion 137 of the sleeve is retracted from circumscribing and sealing relationship with the ports 136. Thus, it is possible to control the flow of fluid from the ports 136 simply by repositioning the sleeve 138 relative to the body 132.

In practice, a plurality of opposed, annular stop shoulders 140 is provided at appropriate locations on the adjacent surfaces of the elongated body 132 and the sleeve 138. These should serve for controlling the extent to which the sleeve 138 is retracted relative to the distal end of the body 132. Further, the base of the body 132 is provided with a segment 142 received within the aforementioned bore 124. The segment 142 also includes a collar, designated 144, for precluding displacement of the body 132 into the bore 124. In practice, a fluid-tight friction fit is established between the adjacent surfaces of the base segment 142 of the body 132 and the adjacent surfaces of the bore 124. If desired, the base segment 142 can be welded in place.

Also seated on the collar 144 is a helical spring 146 circumscribing the body 132 and abutting an annular shoulder 148 formed internally of the sleeve 138. The spring 146 continuously urges the sleeve 138 toward the distal end of the body 132 for thus biasing the linear valve 92 to its closed condition. Of course, if so desired, a plurality of suitable O-ring seals 150 is provided within the sleeve 138 for inhibiting leakage between the adjacent surfaces of the sleeve 138 in the body 132.

It is also to be understood that about a distal end of the sleeve 138 there is provided a distal portion 150 configured to be received within the neck of a reconstitution bag. Thus, the reconstitution bag can readily be coupled with the jet 14 and the linear valve 92 actuated in a one-hand operation, by manually advancing the sleeve 138 against the applied forces of the spring 146.

In view of the foregoing, it is believed readily apparent that the rotary valve 90 serves to control the charging of the chamber 28 while the linear valve 92 cooperates with the rotary valve 90 in controlling the discharge of the chamber so that in order to discharge the chamber, both the rotary valve and the linear valve must be actuated in a prescribed sequence.

OPERATION

It is believed that in view of the foregoing description, the operation of the device will be readily understood and it will be briefly reviewed at this point.

With the dispenser 10 assembled in the manner hereinbefore described, it is mounted along the upper surface of a table, not shown, but of a type normally found in a wardroom of a spacecraft.

As a practical matter, the dispenser 10 can be employed as one of a bank of similar dispensers, each being coupled with a suitable source of potable water. In practice, the dispenser 10 normally is employed as one of a pair wherein one is coupled with a source of "cold" while the other is coupled with a source of "hot" water.

When so mounted, a reconstitution bag, not shown, including therein the food or the beverage to be reconstituted is received about the distal end of the sleeve 138, the knob 128 rotated a distance sufficient to cause the segments of the passageway 102 to concurrently communicate with the chamber intake port 42 and the terminal port 98 of the conduit 94. At this instance, potable water is delivered from the source and received within the chamber 28. The pressure of the source is sufficient to cause the piston head 24 to retract against applied forces of the pair of concentrically related compression springs 40. The piston head 24 now is afforded axial displacement through a distance such that the chamber 28 receives therein a charge of water, the quantity of which having been established by a positioning of the block 64 of the stop 16. A crewman observing the position of the indicator 116 adjacent to the measuring stop 16 is apprised of the charged condition of the chamber 28. Thereupon, the crewman rotates the knob 128 in a direction such that the segments of the passageway 103 are caused to communicate with the chamber ejection port 44, preparatory to discharging the chamber 28.

With the reconstitution bag seated over the distal end of the linear valve, the linear valve 92 is actuated simply by applying an axially directed force to the sleeve 138 sufficient to cause the spring 146 to collapse and the distal end of the sleeve to advance axially away from the ports 136, whereupon the ports are opened for discharge of the water from the chamber 28 via the passageway 103 and the bore 134.

Of course, with the rotary valve 90 rotated to a position wherein the linear valve is caused to communicate with the chamber 28, the chamber intake port 42 is sealed from the pressure of the source of potable water. Consequently, once the ports 136 are uncovered, the pair of springs 40 serves to axially displace the piston head 24 toward the end plate 22 with a force sufficient to eject the water from the chamber ejection port. As the piston head 24 is advanced toward the end plate 22, the indicator 116 is advanced away from the measuring stop 16. At the instant the indicator 116 comes to rest against the base plate 50, the crewman is apprised of a complete discharge of the charge from the chamber 28, whereupon the crewman merely extracts the neck of the bag from about the distal end of the sleeve 138. This releases the sleeve from the manually applied force and permits the spring 146 to again close the port 136 by advancing the sleeve into its initial position wherein the distal end portion 137 of the sleeve 138 circumscribes and closes the ports 136.

Of course, should it be desired to vary the charge of water to be dispensed during a subsequent cycle of operation, the knob 80 is lifted for elevating the shaft 76 and thereby extracting the pin 70 from the pin-receiving opening 68 within which it is seated. Upon being lifted against the force of the spring 82, the block 64 is freed for axial displacement relative to the stop shaft 46. The volume of the chamber 28 thus can be varied, and the extent to which the volume is varied is dictated by the number of openings traversed by the block 64, prior to being coupled again with the shaft 46 as the locking pin 70 is reseated.

In view of the foregoing, it should readily be apparent that the dispenser of the instant invention provides a practical solution to the perplexing problem of accurately measuring, and effeciently dispensing water into reconstitution bags in a weightless environment.

Although the invention has been herein shown and described in what is conceived to be the most practical and preferred embodiment, it is recognized that departures may be made therefrom within the scope of the invention, which is not to be limited to the illustrated details disclosed.

What is claimed is:

1. A potable water dispenser comprising:

a cylindrical measuring chamber for precisely measuring quantities of water to be dispensed;

a rotary valve having a cylindrical valve body disposed in justaposition with said chamber and communicating with a source of water maintained under pressure for selectively charging said chamber;

means interposed between said valve body and said chamber for separating said body and said chamber;

a chamber intake port and a chamber ejection port extending between said chamber and said rotary valve body for affording mutual communication therebetween;

said valve body having a first passageway therein comprising a first radially extended passageway segment and a delivery passageway segment extended in an axial direction from said first radially extended segement;

said valve body having a second passageway therein comprising a second radially extended passageway segment angularly related to said first radially extended segment and communicating with said source of water under pressure;

means including a spring-loaded piston head supported in said measuring chamber for axial displacement in response to introduction of water through said chamber intake port for varying the longitudinal dimension of said chamber;

means including a delivery jet for dispensing measured charges of water;

means including a linear valve for selectively delivering measured charges of water from said chamber to said jet.

2. The invention as defined in claim 1 further comprising selectively operable stop means for limiting displacement of said piston for determining the longitudinal dimension of said chamber, said stop means including:

a tubular piston shaft axially extended from said piston head;

a rigidly supported stop shaft telescopically received within said piston shaft, whereby displacement of said piston head imparts displacement to said piston shaft relative to said stop shaft;

means defining within said stop shaft a plurality of juxtaposed pin-receiving openings;

a slidable block concentrically supported by said stop shaft and axially displaceable therealong;

manually operable, spring-biased means including an axially reciprocable pin continuously urged toward said openings to be received therein for releasably coupling said block with said stop shaft.

3. The invention as defined in claim 1 wherein said first radially extended passageway segment is disposed to communicate with said chamber ejection port and said second radially extended passageway segment is disposed to communicate with said chamber intake port in response to an angular indexing displacement sequentially imparted to said rotary valve.

4. The dispenser of claim 1 wherein said linear valve includes:

A. a tubular body communicating with said delivery passageway having a base coaxially related therewith;

B. means defining within the distal end of said tubular body a plurality of radially extended water ejection ports; and C. a closure sleeve concentrically related to said tubular body supported for axial displacement between a first position wherein the closure sleeve is concentrically related to said ports for closing the ports, and a second position wherein said closure sleeve is axially displaced from said first position whereby said ejection ports are open.

5. The dispenser of claim 4 wherein said linear valve further includes spring means coupled with said sleeve for continuously urging the sleeve toward said first position.

\* \* \* \* \*